US009147365B2

(12) United States Patent
Shiohara

(10) Patent No.: US 9,147,365 B2
(45) Date of Patent: Sep. 29, 2015

(54) IMAGE-DISPLAYING DEVICE AND DISPLAY CONTROL CIRCUIT

(75) Inventor: Ryuichi Shiohara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 211 days.

(21) Appl. No.: 13/109,452

(22) Filed: May 17, 2011

(65) Prior Publication Data

US 2011/0285734 A1    Nov. 24, 2011

(30) Foreign Application Priority Data

May 18, 2010   (JP) ................................. 2010-113978
May 25, 2010   (JP) ................................. 2010-119044
Sep. 27, 2010  (JP) ................................. 2010-214841

(51) Int. Cl.
| G09G 5/00 | (2006.01) |
| G06F 3/038 | (2013.01) |
| G09G 3/36 | (2006.01) |
| G09G 3/32 | (2006.01) |
| G09G 5/40 | (2006.01) |

(52) U.S. Cl.
CPC ............ *G09G 3/3611* (2013.01); *G09G 3/3266* (2013.01); *G09G 5/005* (2013.01); *G09G 5/40* (2013.01); *G09G 2310/0224* (2013.01); *G09G 2310/0232* (2013.01); *G09G 2310/04* (2013.01); *G09G 2310/067* (2013.01); *G09G 2310/08* (2013.01); *G09G 2340/0414* (2013.01); *G09G 2340/0421* (2013.01); *G09G 2340/145* (2013.01)

(58) Field of Classification Search
USPC .................. 345/531, 532, 533, 534, 204, 502
See application file for complete search history.

(56) References Cited

U.S. PATENT DOCUMENTS 5,617,113 A * 4/1997 Prince ............................ 345/103
5,629,744 A * 5/1997 Kawamura .................... 348/792
(Continued)

FOREIGN PATENT DOCUMENTS

| EP | 0678847 A1 | 10/1995 |
| JP | 07-294883 A | 11/1995 |

(Continued)

OTHER PUBLICATIONS

Extended European Search Report dated Jun. 14, 2012 for the corresponding European Patent Application No. 11166422.3.
(Continued)

*Primary Examiner* — Mark Zimmerman
*Assistant Examiner* — Michelle Chin
(74) *Attorney, Agent, or Firm* — Global IP Counselors, LLP

(57) ABSTRACT

An image-displaying device includes an image data generation section, an information data acquisition section, and a display control section. The information data acquisition section is configured to acquire information data for causing predetermined information to be displayed on an information display region. The display control section is configured to control a display section to display an image of a subject in a subject image display region of the display section according to image data generated by processing for generating the image data, and to display the predetermined information in the information display region of the display section according to the information data. The display control section is configured to control the display section so that a predetermined unit display time taken to refresh a display in each of predetermined units in the information display region is shorter than the predetermined unit display time in the subject image display region.

7 Claims, 6 Drawing Sheets

(56) References Cited

U.S. PATENT DOCUMENTS

| | | | |
|---|---|---|---|
| 6,133,900 A * | 10/2000 | Esaki | 345/660 |
| 7,710,468 B2 * | 5/2010 | Uchida et al. | 348/231.99 |
| 7,868,890 B2 * | 1/2011 | Ludwin et al. | 345/502 |
| 8,937,673 B2 | 1/2015 | Shiohara et al. | |
| 2005/0052542 A1 | 3/2005 | Iwai et al. | |
| 2005/0184993 A1 | 8/2005 | Ludwin et al. | |
| 2007/0097104 A1 | 5/2007 | Kuroki | |
| 2007/0211153 A1 | 9/2007 | Uchida et al. | |
| 2008/0151070 A1 | 6/2008 | Shiozawa et al. | |
| 2009/0047010 A1 | 2/2009 | Yoshida et al. | |

FOREIGN PATENT DOCUMENTS

| | | |
|---|---|---|
| JP | 2001-113039 A | 4/2001 |
| JP | 2004-325821 A | 11/2004 |
| JP | 2005-073077 A | 3/2005 |
| JP | 2005-275357 A | 10/2005 |
| JP | 2007-243615 A | 9/2007 |

OTHER PUBLICATIONS

The Extended European Search Report dated Dec. 23, 2011 for the corresponding European Patent Application No. 11166419.9.

* cited by examiner

IMAGE-DISPLAYING DEVICE AND DISPLAY CONTROL CIRCUIT

CROSS-REFERENCE TO RELATED APPLICATIONS

This application claims priority to Japanese Patent Application No. 2010-119044 filed on May 25, 2010, Japanese Patent Application No. 2010-113978 filed on May 18, 2010, and Japanese Patent Application No. 2010-214841 filed on Sep. 27, 2010. The entire disclosures of Japanese Patent Application Nos. 2010-119044, 2010-113978 and 2010-214841 are hereby incorporated herein by reference.

BACKGROUND

1. Technical Field

The present invention relates to an image-displaying device and a display control circuit for displaying an image of a subject on a display section.

2. Related Art

There are known in the art image-capturing devices for displaying on a liquid crystal display an image captured using an image-capturing sensor. A variety of techniques have been developed in order to prevent the image of the subject on the liquid crystal display from being displayed with any delay. For example, in Japanese Laid-Open Patent Application Publication No. 2007-243615, there is disclosed a technique whereby, in an image-capturing device comprising a VRAM for recording image signals corresponding to a single frame, an image signal is read and displayed on a liquid crystal display before an image signal corresponding to a single frame has been completely written to the VRAM. Specifically, there is described a configuration in which the display of images on the liquid crystal display is commenced at a playback timing that is delayed by a time $\Delta T$ with respect to a drive timing at which the image-capturing sensor is driven.

SUMMARY

In the technique according to Japanese Laid-Open Patent Application Publication No. 2007-243615, the cycle of the drive timing and the playback timing is a cycle for processing an image corresponding to a single frame, and a fixed $\Delta T$ is defined in relation to individual frames. In other words, according to the technique described in this publication, it is described that $\Delta T$ is defined for specific modes (Japanese Laid-Open Patent Application Publication No. 2007-243615, paragraph [0057]), and that $\Delta T$ is determined so that reading of the image data does not precede the writing (Japanese Laid-Open Patent Application Publication No. 2007-243615, paragraphs [0055] and [0056]). Therefore, although $\Delta T$ may fluctuate between modes, $\Delta T$ has a common value in relation to each frame within the same mode, and a common phase difference $\Delta T$ is allocated to all lines of the image to be displayed.

However, the display section may display the image of the subject and information relating to the image-capturing conditions and other factors, generated according to data outputted from the image-capturing sensor, and a variety of other subjects to be displayed. If there is a difference in the types of display subjects to be displayed on the display section, there may be a difference in the time necessary to generate the display subject. Therefore, in order to provide a common phase difference $\Delta T$ to ensure that reading of the image data that shows an image corresponding to a single frame, and intended to be displayed, does not precede the writing, it is necessary to make an allowance when defining $\Delta T$ so that the reading does not occur in advance. For example, it becomes necessary to make considerations, such as defining, as $\Delta T$, the longest possible time required to generate the display subject. Therefore, in a configuration in which the time required to generate a display subject may vary between display subjects, unnecessary delays may occur in the display being commenced with regards to display subjects that can be generated early.

With the above-mentioned problem in view, an object of the present invention is to perform a display on a display section in a satisfactory manner.

In order to achieve the above object, an image data generating process, for generating image data representing an image of a subject, is performed according to data outputted from an image-capturing sensor (i.e., an area image sensor), and an image of the subject is displayed on a subject image display region of a display section according to the generated image data. Also, predetermined information represented by information data is displayed on an information display region of the display section, based on the information data. In this instance, a control is performed so that a predetermined unit display time taken to refresh a display in an individual predetermined unit (e.g., a single line in the horizontal direction) is shorter in the information display region than in the subject image display region.

Specifically, whether or not it is possible to display an image of the subject according to data outputted from the image-capturing sensor depends on the progress of the image data generating process. Meanwhile, the subject of display on the information display region is the predetermined information; information that may be displayed is specified in advance. Therefore, it is possible to record the information data on a memory device before display is commenced. When recording of the information data on the memory device is complete, it is possible to refer to the memory device, sequentially obtain the information data, and thereby perform a display on the display section. Accordingly, there is no need to wait for the information data generating process to be completed or otherwise provide a standby time when displaying, on the information display region, information represented by the information data; and it is possible to display the predetermined information on the information display region at the highest speed at which the displaying can be performed. The present invention is configured so that the predetermined unit display time taken to refresh a display is shortened in at least the information display region in relation to the subject image display region. This configuration makes it possible to minimize unnecessary delays in at least the information display region, and to reduce delays in performing displaying on the display section.

According to the aspect described above, an image data generation section is capable of generating the image data representing the image of the subject according to the data outputted from the image-capturing sensor, and displaying on the display section the image of the subject according to the image data. The image data generating process may comprise image processing of a desired type. The time required for processing may vary according to the data outputted from the image-capturing sensor, the mode enabled in the image-capturing device, image-capturing conditions, and other factors. The time required for processing may also be unknown.

An information data acquisition section is capable of obtaining the information data for displaying the predetermined information on the information display region. Specifically, the information data acquisition section is configured so as to be capable of obtaining the information data recorded in the memory device in advance so that the information data can be obtained from the memory device without a standby time being provided, the obtaining being performed when a display control section causes the information display region to commence display of the predetermined information. The predetermined information may be information representing an animation or another moving image (i.e., an image in which each frame is a static image but in which the content of display changes with frame change) as long as the configuration makes it possible to obtain the information data from the memory device without a standby time being provided.

A display control section is capable of refreshing a display on individual predetermined units, the performing of the display renewal taking a predetermined unit display time that varies between each region in the display section; and is capable of displaying, on the display section, the image of the subject and the predetermined information. For example, a region defined in advance is defined as the subject image display region for displaying the image of the subject, a region other than the subject image display region is defined as the information display region, and the predetermined unit display time for the latter region is caused to be shorter than the predetermined unit display time for the former region.

Shortening of the predetermined unit display time can be achieved using a variety of techniques. The predetermined unit display time in each of the regions may be fixed or may fluctuate. Also, the size of each of the regions may be fixed or may fluctuate. The predetermined unit display time is the time taken for refreshing the display corresponding to a single predetermined unit in the display section which displays an image corresponding to a single frame, rewrites the image after a predetermined time, and thereby displays a moving image or a static image. For example, in a display section that performs the display refreshing process corresponding to a single predetermined unit in synchronization with a horizontal synchronizing signal, the horizontal synchronizing time prescribed by the horizontal synchronizing signal corresponds to the predetermined unit display time.

The delay in performing displaying when displaying is performed according to the image data may also be minimized. For example, a configuration is obtained in which progress information representing the progress of the image data generating process is obtained for each of the predetermined units, and a predetermined unit, for which it has been determined by the progress information that the processing for generating the image data has ended, is caused to be displayed on the subject image display region. According to this configuration, it is possible to minimize the delay in performing displaying in a predetermined unit when the image of the subject is displayed on the subject image display region according to image data in a configuration in which the time required for the image data generating process may fluctuate between predetermined units. The minimization of the delay in performing displaying is combined with the shortening of the predetermined unit display time in the information display region, making it possible to reduce the time required to display on the display section an image corresponding to a single frame.

A configuration is also possible in which the shortening of the predetermined unit display time in the information display region is used and the time required to display on the display section an image corresponding to a single frame is fixed. In this instance, a configuration is possible in which a total of a sum of the predetermined unit display time in the subject image display region and a sum of the predetermined unit display time in the information display region is kept to a predetermined length of time. In the present application, the phrases "is fixed" and "is maintained at a predetermined length of time" are not used in the strictest sense; they also include instances in which small variations, including errors, are present. This configuration can be obtained by, e.g., estimating a reference time. In other words, a time that represents a reference for the predetermined unit display time is defined in advance as a reference time. Then, a configuration is obtained so that the delay in relation to the reference time of the predetermined unit display time in the subject image display region is eliminated by shortening the predetermined unit display time in the information display region. This configuration can be achieved by, e.g., shortening the predetermined unit display time so that a value obtained by subtracting, from the reference time, a value obtained by dividing the total sum of the delay described above by the number of predetermined units in the information display region represents an upper limit value of the predetermined unit display time in the information display region. According to this configuration, it is possible to display on the display section according to the present invention an image corresponding to a single frame with respect to a time that is equal to or shorter than the time required to display an image corresponding to a single frame in a normal display section in which the reference time is taken to refresh the display in each of the predetermined units.

The reference time may be defined as a time that may be compared with the predetermined unit display time in the subject image display region and the information display region. According to one possible configuration, for example, a fixed horizontal synchronizing time prescribed as the time required to perform a display corresponding to the number of predetermined units in the display section is taken as the reference time within a time for displaying an image for a single frame (e.g., vertical synchronization time).

It is also possible to use, as a suitable configuration when determining the amount by which the predetermined unit display time in the information display region is shortened according to the delay with respect to the reference time for the predetermined unit display time in the subject image display region, a configuration in which a subject image display region is formed by a single region that is continuous in a direction in which the predetermined units are arranged, and in which, when displaying corresponding to a single frame is performed, displaying in the subject image display region is performed in a continuous manner, and displaying in the information display region is performed in a continuous manner after the displaying in the subject image display region has been performed. Specifically, when displaying corresponding to a single frame is performed, displaying is performed starting from the predetermined unit that is positioned at one end of the subject image display region. After displaying has been performed at the predetermined unit positioned at another end of the subject image display region, displaying is performed in each of the predetermined units in the information display region, starting from the predetermined unit that is adjacent to the another end of the subject image display region.

According to this configuration, it becomes possible to perform displaying in the information display region after performing displaying in the subject image display region, and it becomes possible to readily determine an amount by which the predetermined unit display time is to be shortened in the information display region. The end parts of the subject image display region may or may not coincide with the end parts of the display section. For example, in an instance in which the upper end of the subject image display region and the upper end of the display section coincide, and the lower end of the subject image display region is positioned further upward of the lower end of the display section, it is possible to perform displaying from the upper end to the lower end of the display section, and thereby perform displaying in the information display region after performing displaying in the subject image display region. In an instance in which the upper end of the subject image display region is positioned further downward of the upper end of the display section, and the lower end of the subject image display region is positioned further upward of the lower end of the display section (i.e., in an instance in which the information display region is present above and below the subject image display region), displaying is performed starting from the upper end of the subject image display region, instead of the upper end of the display section, and displaying is performed down to the lower end of the subject image display region. Then, displaying is performed on the predetermined unit of the information display region that is adjacent to the lower end of the subject image display region, and displaying is then performed downwards. When displaying has been performed down to the lower end of the display section, displaying is then further performed from the upper end of the display section to the lower end of the remaining information display region. Again, according to this configuration, it is possible to perform displaying in the information display region after displaying is performed in the subject image display region.

A technique for shortening the predetermined unit display time taken to refresh a display on individual predetermined units in the information display region compared to that in the subject image display region, such as that according to the present invention, can also be applied as a circuit, a program, or a method. A circuit, a device, a program, or a method of such description may be achieved as an individual circuit or a device, or may be achieved using components that are shared in a device having multiple functions, and include a variety of types of embodiment

BRIEF DESCRIPTION OF THE DRAWINGS

Referring now to the attached drawings which form a part of this original disclosure.

DETAILED DESCRIPTION OF EXEMPLARY EMBODIMENTS

A description will now be given for an embodiment of the present invention according to the following sequence: (1) Configuration of the image-capturing device; (2) Control of the horizontal synchronizing signal; and (3) Other embodiments.

(1) Configuration of Image-Capturing Device

Figure 1:
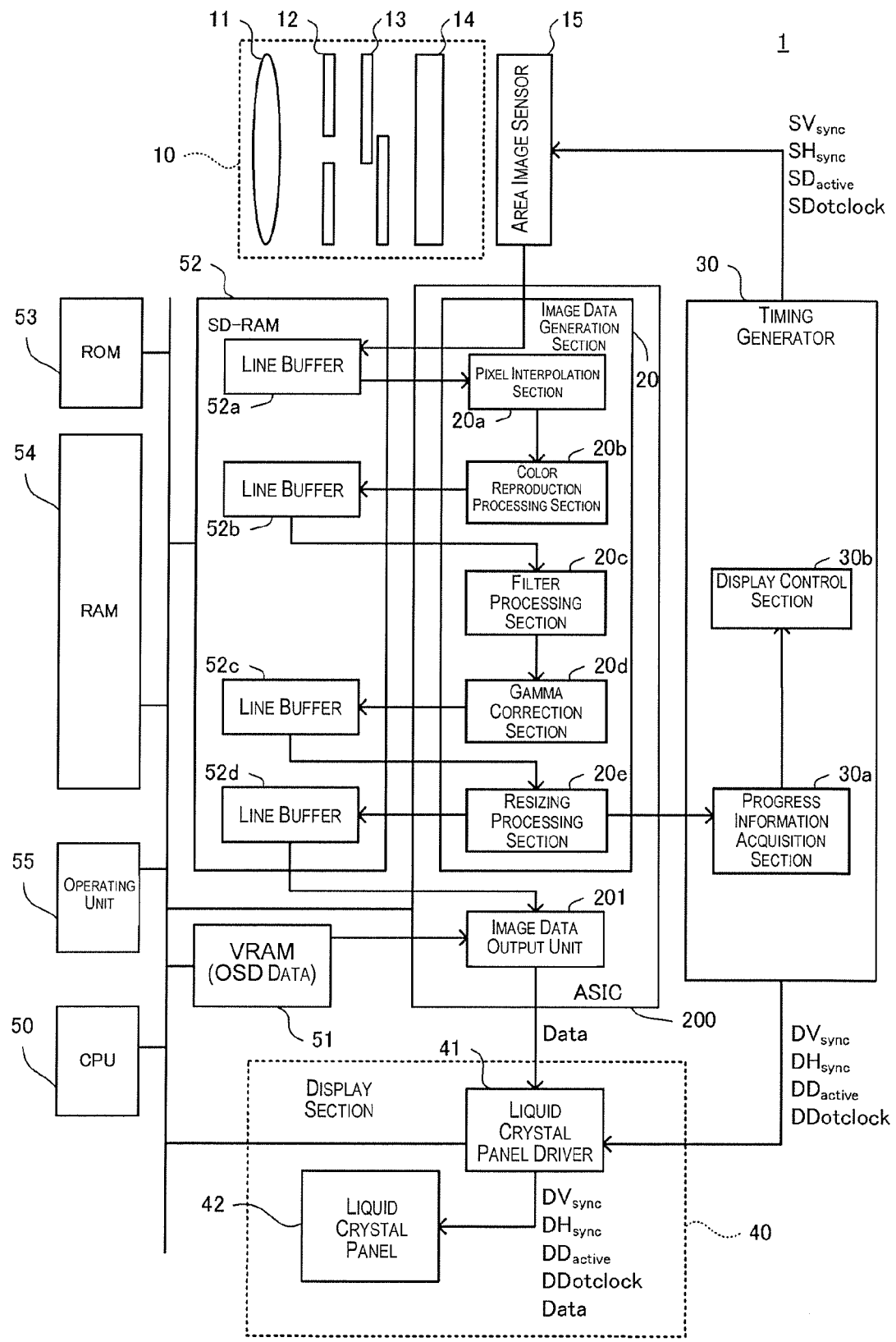
FIG. 1 is a block diagram of an embodiment of the present invention.

An image-capturing device 1 (image-displaying device) according to an embodiment of the present invention shown in FIG. 1 includes an optical system 10, an area image sensor 15 (corresponding to the image-capturing section), an ASIC 200, a timing generator 30, a display section 40, a CPU 50, a VRAM 51, an SD-RAM 52, a ROM 53, a RAM 54, and an operating unit 55. The CPU 50 is capable of using the VRAM 51, the SD-RAM 52, and the RAM 54 as appropriate and executing a program recorded in the ROM 53. The CPU 50 uses the program to perform a function of generating image data that represents a subject whose image is captured by the area image sensor 15 in accordance with an operation performed on the operating unit 55. The operating unit 55 comprises a shutter button; a dial switch that represents mode switching means for switching between modes; a dial switch for switching the aperture and shutter speed; and a push button for operating a variety of types of setting menus. The user can operate the operating unit 55 to issue a variety of types of commands to the image-capturing device 1.

The display section 40 is an EVF (i.e., electronic view finder) for displaying an image representing the subject whose image is captured, and causing the user to obtain the state of the subject before the image is captured, image-capturing conditions, and other information. The image-capturing device 1 according to the present embodiment is a mirrorless digital camera comprising the EVF. The display section 40 comprises an interface circuit (not shown), a liquid crystal panel driver 41, a liquid crystal panel 42, an ocular lens (not shown), and other components. In the present embodiment, the liquid crystal panel 42 is a high temperature poly-silicon TFT (thin film transistor) in which each pixel comprises three subpixels corresponding to color filters for three colors. The position of the pixels is prescribed by coordinates in an orthogonal coordinate system. The liquid crystal panel 42 is configured so that a line is formed by a plurality of pixels arranged in a direction parallel to one of the coordinate axes, and a plurality of lines are arranged in a direction parallel to the other coordinate axis. In the present specifications, the direction parallel to the line is referred to as the horizontal direction, the direction orthogonal to the line is referred to as the vertical direction, and a single screen formed by all of the pixels of the liquid crystal panel 42 is referred to as a single frame.

The liquid crystal panel driver 41 outputs, to the liquid crystal panel 42, a signal for applying a voltage to each of the subpixels and driving liquid crystal. The liquid crystal panel 42 comprises a gate driver and a source driver (not shown). The gate driver controls the display timing in each of the pixels in each of the lines according to the signal outputted from the liquid crystal panel driver 41. The source driver applies, to each of the pixels of the line corresponding to the display timing, a voltage corresponding to the image data for each of the pixels, and thereby performs displaying. Specifically, the liquid crystal panel driver 41 is configured so as to output a variety of types of signals for performing displaying on the liquid crystal panel 42, such as, e.g., a vertical synchronizing signal (DVsync) for prescribing a time for performing displaying corresponding to a single frame, a horizontal synchronizing signal (DHsync) for prescribing a time for performing displaying corresponding to a single line, a data active signal (DDactive) for prescribing a loading time for image data within each of the lines, a data clock signal (DDotclock) for prescribing the loading time for image data for each of the pixels and similar variables, and the image data (Data) for each of the pixels.

The image-capturing device 1 according to the present embodiment comprises a timing generator 30. The vertical synchronizing signal DVsync, the horizontal synchronizing signal DHsync, the data active signal DDactive, and the data clock signal DDotclock described above are generated by the timing generator 30. Specifically, the timing generator 30 comprises a display control section 30b comprising a division circuit or a similar structure for generating a signal whose signal level changes in synchronization with the timing of change in a clock signal having a predetermined cycle outputted from clock signal generating means. Through a control performed by the display control section 30b, the timing generator 30 then generates the vertical synchronizing signal DVsync, the data active signal DDactive, and the data clock signal DDotclock whose signal levels change according to a timing determined in advance. In the present embodiment, the output timing of the horizontal synchronizing signal DHsync is variable. As described further below, the output timing is determined in dependence with a result of processing by a resizing processing section 20e In the present embodiment, the liquid crystal panel 42 is a panel whose number of pixels corresponds with an XGA-sized panel having 1024 valid pixels in the horizontal direction and 768 valid pixels in the vertical direction. Adjusting the content and output timing of the image data Data outputted by the liquid crystal panel driver 41 makes it possible to perform displaying at a tone that corresponds with the Data and at a desired position. The present embodiment is configured so that an image of the subject is displayed, according to the data outputted from the area image sensor 15, on a subject image display region defined in advance on the liquid crystal panel 42. The present embodiment is also configured so that characters representing image-capturing conditions and similar information are displayed on an information display region other than the subject image display region. Specifically, characters representing the image-capturing conditions and similar information are displayed on-screen (i.e., on an on-screen display (OSD)), along with the image of the subject, on the liquid crystal panel 42. Although the liquid crystal panel 42 comprises a greater number of pixels in the horizontal direction and the vertical direction than the number of valid pixels, for simplicity, a description for a process relating to pixels other than the valid pixels is not provided in the present specifications.

The optical system 10 comprises a lens 11 for forming an image of the subject on the area image sensor 15; and an aperture stop 12, a shutter 13, and a low-pass filter 14. Of these, the lens 11 and the aperture stop 12 are attached, so as to be replaceable, on a casing (not shown). A CMOS (complementary metal oxide semiconductor) image sensor, a CCD (charge coupled device) image sensor, or another solid-state image sensing device comprising color filters arranged in a Bayer pattern and a plurality of photodiodes that accumulate, on individual pixels and using photoelectric conversion, an electrical charge corresponding to light intensity, is used as the area image sensor 15. The position of pixels on the area image sensor 15 is prescribed by coordinates in an orthogonal coordinate system. The area image sensor 15 is configured so that a line is formed by a plurality of pixels arranged in a direction parallel to one of the coordinate axes, and a plurality of lines are arranged in a direction parallel to the other coordinate axis. In the present specifications, the direction parallel to the line is referred to as the horizontal direction, the direction orthogonal to the line is referred to as the vertical direction, and a single screen formed by all of the pixels of the area image sensor 15 is referred to as a single frame.

In the present embodiment, the area image sensor 15 also operates in synchronization with a variety of types of signals outputted by the timing generator 30. Specifically, the timing generator 30 outputs a vertical synchronizing signal (SVsync) for prescribing a time for reading the result of detection by the photodiodes corresponding to a single frame, a horizontal synchronizing signal (SHsync) for prescribing a time for reading the result of detection by the photodiodes corresponding to a single line, and a data clock signal (SDotclock) for prescribing the timing for reading the image data for each of the pixels and similar variables. The area image sensor 15 starts outputting the output data corresponding to a single frame according to the vertical synchronizing signal SVsync, and sequentially reads the output data representing the result of detection by the photodiodes corresponding to some of the pixels of the area image sensor 15 within the time prescribed by the horizontal synchronizing signal SHsync and according to a timing corresponding to the data clock signal SDotclock.

The ASIC 200 comprises an image data generation section 20 comprising a circuit for using line buffers 52a through 52d corresponding to a plurality of lines, the line buffers being provided in advance to the SD-RAM 52, and for generating, using pipeline processing, image data for displaying an image of the subject on the display section 40. The line buffers 52a through 52d corresponding to a plurality of lines may also be provided to the image data generation section 20 or another component. The display section 40 displays the subject on the liquid crystal panel 42 according to the generated image data. Specifically, the user is able to observe the subject while using the display section 40 as the EVF. The ASIC 200 may also be a DSP (digital signal processor) for image processing.

In an instance in which the user has operated the operating unit 55 to perform a command to capture an image, the area image sensor 15 starts outputting, according to the image capture command, output data corresponding to a single frame according to the vertical synchronizing signal SVsync, and sequentially reads the output data representing the result of detection by the photodiodes corresponding to all valid pixels of the area image sensor 15 within the time prescribed by the horizontal synchronizing signal SHsync and according to the timing corresponding to the data clock signal SDotclock. The image data generation section 20 then uses the SD-RAM 52, generates image data in JPEG or a similar format, and records the image data in a removable memory device or another device (not shown). In other words, the user is able to generate image data representing the subject.

(2) Control of Horizontal Synchronizing Signal

Figure 2:
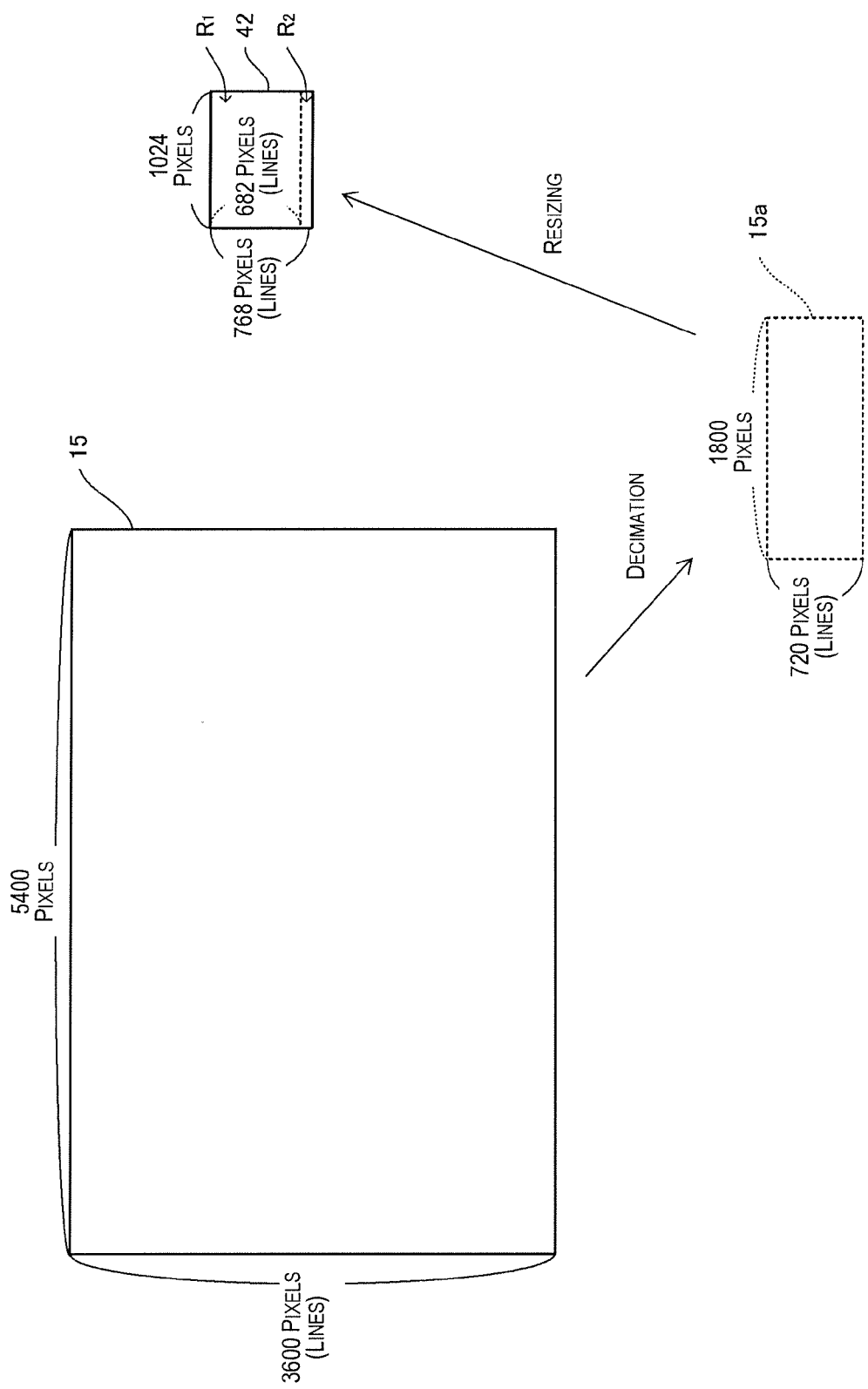
FIG. 2 is a diagram showing the number of pixels in an area image sensor and a liquid crystal panel.

Taking into consideration the image data representing the subject being recorded in a removable memory device or a similar device and being printed, and other factors, it is preferable that the number of pixels in the area image sensor 15 is larger than a predetermined number in order to obtain image data having a high quality. Therefore, the number of valid pixels in the area image sensor 15 according to the present embodiment is 5400 pixels in the horizontal direction and 3600 pixels in the vertical direction as shown in FIG. 2. The area image sensor 15 comprises a greater number of pixels in the horizontal direction and the vertical direction than the number of valid pixels, for simplicity, a description for a process relating to pixels other than the valid pixels is not provided in the present specifications.

As described above, the liquid crystal panel 42 is configured so as to comprise 1024 pixels in the horizontal direction and 768 pixels in the vertical direction, and so that the image of the subject is displayed on the subject image display region (indicated by R1 in FIG. 2). In the present embodiment, in order to display the image of the subject as large as possible while maintaining the aspect ratio (i.e., 2:3) of the area image sensor 15, a rectangular region having an aspect ratio of 2:3 and having an upper, left, and right edge that is in contact with an upper, left, and right edge of the liquid crystal panel 42 respectively is the subject image display region R1 for displaying the image of the subject. The remaining region represents the information display region for displaying characters representing image-capturing conditions and other information (i.e., region shown in FIG. 2). Therefore, the subject image display region R1 in the liquid crystal panel 42 comprises 1024 pixels in the horizontal direction and 682 pixels in the vertical direction. As described above, according to the present embodiment, the number of pixels in the area image sensor 15 and the number of pixels in the liquid crystal panel 42 do not match.

Also, since the display on the display section 40 is used by the user to observe the subject, if, in relation to a delay between the timing at which the image of the subject is captured by the area image sensor 15 and the timing at which the image of the subject whose image has been captured is displayed on the display section 40, the delay increases and reaches a length that can be perceived by the user, a mismatch occurs between the subject visually observed through the EVF and the image of the subject that is recorded, or the EVF otherwise becomes extremely troublesome to use. Therefore, it is necessary, when the display section 40 is used as the EVF, that there is little delay.

Therefore, in order to cause the image captured by the area image sensor 15 to be displayed on the display section 40 so that the delay is of an extremely short length that cannot be visually observed by humans, in the present embodiment, a variety of processes are performed in the area image sensor 15 and the image data generation section 20, and the display section 40 comprises a configuration for causing the image data generated as a result of these processes to be displayed at a high speed.

Specifically, the area image sensor 15 according to the present embodiment is provided with a circuit that is capable of performing an interlace scan in which the results of detection by the photodiodes are read at a ratio of one line for every n lines (where n is an odd number) arranged in the vertical direction. The area image sensor 15 is also provided with an adder for adding the results of detection from m photodiodes, arranged in the horizontal direction, that perform photoelectric conversion through color filters of the same color, and outputting a value obtained by dividing the resulting sum by m (i.e., the arithmetic mean of m results of detection). The present embodiment is configured so that, when the display section 40 is caused to function as an EVF, interlace scanning and processing by the adder are performed in the area image sensor 15, decimating pixels in the horizontal direction and the vertical direction; output data for a number of pixels that is smaller than the number of pixels provided to the area image sensor 15 is outputted; and the image of the subject is thereby captured at a high speed.

Figure 3:
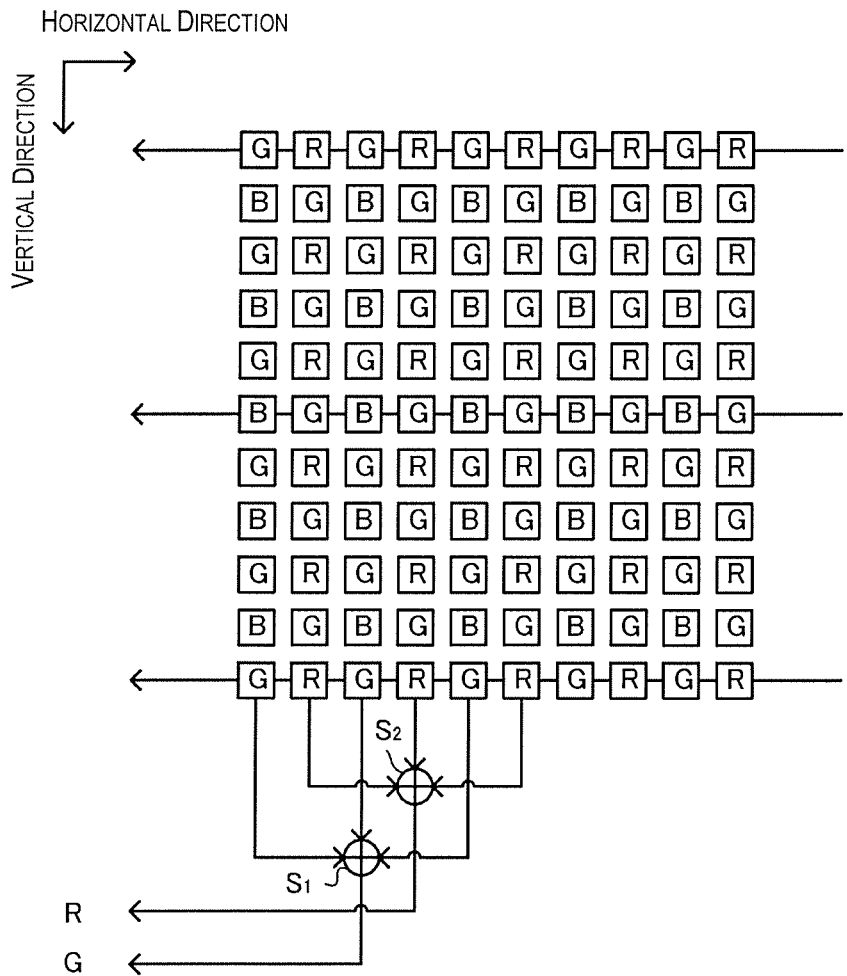
FIG. 3 is a diagram showing an example of a method for outputting data outputted from the area image sensor.

Specifically, in the live view mode in which the display section 40 is caused to function as the EVF, the area image sensor 15 performs reading in which lines arranged in the vertical direction are read at a ratio of one line for every n lines in correspondence with the horizontal synchronizing signal SHsync. Also, the area image sensor 15 performs a process of outputting the result of the addition performed by the adder on the results of detection by m photodiodes, as output data, in correspondence with the data clock signal SDotclock. FIG. 3 shows an example of a method for outputting output data having a smaller number of pixels than the number of pixels provided to the area image sensor 15 according to the present embodiment. In FIG. 3, rectangles labelled R represent photodiodes that correspond to color filters that transmit light in the red region, rectangles labelled G represent photodiodes that correspond to color filters that transmit light in the green region, and rectangles labelled B represent photodiodes that correspond to color filters that transmit light in the blue region.

In an instance in which the color filters, represented by rectangles, for each of the pixels are arranged in a Bayer pattern as shown in FIG. 3, only a color filter of one color corresponds to each of the pixels. Therefore, the color of each of the pixels must be interpolated using surrounding pixels. Therefore, when decimation is performed on the lines and the output data is obtained, it is necessary to perform decimation so that the color filters of adjacent lines have different colors after decimation. Therefore, in the present embodiment, if, at a ratio of one line for every n lines, the values detected by the photodiodes of each of the corresponding lines are obtained as output data, where n is an odd number, it is possible to obtain output data using which the color of each of the pixels can be determined by interpolation. The present embodiment is configured so as to obtain output data at a ratio of one line for every 5 lines so that the number of lines in the area image sensor 15 in the vertical direction is as near as possible to the number of lines in the subject image display region R1 of the liquid crystal panel 42 in the vertical direction. In FIG. 3, the leftward arrows indicate the obtaining of the output data at a ratio of one line for every 5 lines. In this example, there are one-fifth as many lines in the vertical direction, i.e., 720.

Also, in an instance in which the color filters are arranged in a Bayer pattern, pixels that are adjacent to each other have different colors, while color filters of the same color are arranged at every other pixel. Therefore, performing m additions with regards to every other pixel arranged in the horizontal direction and dividing the resulting sum by m (i.e., obtaining the arithmetic mean of m results of detection) make it possible to substantially perform the decimation process. In the present embodiment, due to reasons such as restrictions in terms of image quality when addition is performed using the adder, m is set to 3. FIG. 3 shows a configuration in which, with regards to the lowermost line shown, the arithmetic mean of the results of detection from three photodiodes, arranged in the horizontal direction, that perform photoelectric conversion through green color filters are added by the adder S1 and divided by three, and the results of detection from three photodiodes, arranged in the horizontal direction, that perform photoelectric conversion through red color filters are added by the adder S2 and divided by three. In this example, there are one-third as many pixels in the horizontal direction, i.e., 1800 pixels. In FIG. 2, the data size in the area image sensor 15 after decimation is represented by a rectangle 15a shown by broken lines.

As described above, the area image sensor 15 may be configured so that the number of lines in the vertical direction is 720 and the number of pixels in the horizontal direction is 1800. However, when performing decimation as described above, n is an odd number in the vertical direction and m is a natural number in the horizontal direction, and there are other restrictions in terms of image quality. Therefore, it is difficult to match the number of pixels after decimation and the number of pixels in the subject image display region R1 of the liquid crystal panel 42. Also, in an instance in which n and m are different to each other as described above, the aspect ratio will also be different between the subject and the image of the subject in the liquid crystal panel 42.

Therefore, the present invention is configured so that the image data generation section 20 performs a further resizing of output data after decimation and generating image data for performing displaying on the subject image display region R1 of the liquid crystal panel 42. Specifically, the image data generation section 20 comprises a pixel interpolation section 20a, a color reproduction processing section 20b, a filter processing section 20c, a gamma correction section 20d, and the resizing processing section 20e. The image data generation section 20 is configured so that, in the course of generating the image data, the number of pixels in the horizontal direction and the vertical direction is modified using the resizing processing section 20e, thereby generating image data having a number of pixels that is equal to that of the subject image display region R1 in the liquid crystal panel 42.

The line buffer 52a is a buffer memory for temporarily recording output data after decimation, outputted from the area image sensor 15. When the output data after decimation is outputted from the area image sensor 15, the image data generation section 20 performs processing to temporarily record the output data in the line buffer 52a. The pixel interpolation section 20a performs an interpolation process while loading from the line buffer 52a data for the number of pixels necessary to generate the colors of two channels missing from each of the pixels in a Bayer pattern, and thereby generates the colors of the two channels. As a result, data corresponding to three channels is generated in each of the pixels. Next, the color reproduction processing section 20b performs a 3×3 matrix operation according to the generated data, and thereby performs a color conversion process for color matching. Data generated by the color conversion process is temporarily stored in the line buffer 52b. Next, the filter processing section 20c performs sharpness adjustment, noise removal process, and other processes using filter processing. Next, the gamma correction section 20d performs gamma correction for compensating the difference in characteristics between a color represented by a gradation value in the output data from the area image sensor 15 and a color represented by a gradation value in the image data handled by the display section 40. Data generated by the gamma correction is temporarily stored in a line buffer 52c.

The data recorded for each line, i.e., line by line, in the line buffer 52c are the number of pixels decimated in the area image sensor 15. In other words, data of 720 lines in the vertical direction and 1800 pixels in the horizontal direction are recorded line by line. The resizing processing section 20e performs resizing by sequentially referencing the data recorded in the line buffer 52c to perform interpolation computation processing and determine the gradation value of each channel in the positions between pixels. In the present embodiment, since the decimation in the area image sensor 15 described above is ⅕ in the vertical direction and ⅓ in the horizontal direction, the aspect ratio of the decimated data differs from the aspect ratio of the output data of the area image sensor 15, as shown in the rectangle 15a in FIG. 2. Therefore, the resizing processing section 20e first performs reduction processing for reduction to a size of approximately 57% in the horizontal direction on the basis of the data recorded in the line buffer 52c. As a result, the number of pixels in the horizontal direction is set to 1024. The resizing processing section 20e also performs reduction processing for reduction to a size of approximately 95% in the vertical direction. As a result, image data are generated for which there are 1024 pixels in the horizontal direction and 682 lines in the vertical direction. The generated image data are recorded line by line in the line buffer 52d.

In the present embodiment, by the processing described above, generation processing is performed for generating image data that can be displayed in the subject image display region R1 of the liquid crystal panel 42 based on the output data of the area image sensor 15, but the output data of the area image sensor 15 have 720 lines in the vertical direction, which is different from the number of lines of the image data in the vertical direction, which is 682, and from the number of lines of the liquid crystal panel 42 in the vertical direction, which is 768. In other words, different numbers of lines are required to capture a single frame and to display a single frame.

Therefore, in the present embodiment, the horizontal synchronization signal SHsync, the vertical synchronization signal SVsync, the data active signal SDactive, and the data clock signal SDotclock of the area image sensor 15 are set to the cycle necessary for driving the area image sensor 15. In other words, the timing generator 30 outputs the horizontal synchronization signal SHsync the number of times and at the timing whereby the decimation in the vertical direction such as described above can be performed in the area image sensor 15, and the output data of the number of lines corresponding to a single frame can be obtained within the time prescribed by the vertical synchronization signal SVsync. The timing generator 30 also outputs the data clock signal SDotclock the number of times and at the timing whereby decimation in the horizontal direction such as described above can be performed, and the output data of the number of pixels of a single line can be obtained within the time prescribed by the horizontal synchronization signal SHsync.

The present embodiment is configured so that the horizontal synchronizing signal DHsync is outputted at the time when the image data for performing displaying has been prepared with respect to each of the lines of the liquid crystal panel 42, in order to minimize the delay time and perform displaying in the liquid crystal panel 42 according to the output data outputted line by line from the area image sensor 15. Specifically, in the present embodiment, the liquid crystal panel 42 is able to perform displaying of lines for which processing by the resizing processing section 20e has ended. Therefore, the timing generator 30 outputs a horizontal synchronizing signal DHsync for performing displaying of the $N^{th}$ line at the time when the processing for generating the image data for the $N^{th}$ line (where N is a natural number) of the liquid crystal panel 42 in the vertical direction is complete.

Specifically, the timing generator 30 comprises a progress information acquisition section 30a. The progress information acquisition section 30a is able to obtain, from the resizing processing section 20e, progress information showing lines for which the processing for generating the image data in the resizing processing section 20e has ended. Therefore, it is possible to use the progress information to determine lines for which it has become possible to perform displaying in the liquid crystal panel 42 according to the image data. Therefore, the timing generator 30 outputs the horizontal synchronizing signal DHsync in synchronization with the timing at which the processing for generating the image data for each of the lines has ended, and thereby causes the liquid crystal panel 42 to commence displaying of lines for which the processing for generating the image data is complete. According to this configuration, it is possible to immediately display each of the lines when preparation for displaying each of the lines is complete, without commencing displaying of each of the lines before the image data is prepared.

Since the liquid crystal panel 42 is preferably capable of displaying the pixels of each of the lines of the liquid crystal panel 42 within the horizontal synchronization time prescribed by the output timing of the horizontal synchronization signal DHsync, the timing generator 30 outputs the data active signal DDactive and the data clock signal DDotclock so that the pixels of a single line can be displayed within a time assumed to be the time in which the horizontal synchronization time prescribed by the output timing of the horizontal synchronization signal DHsync is shortest.

Also, the present embodiment is set up so that the vertical synchronizing signal SVsync of the area image sensor 15 and the vertical synchronizing signal DVsync of the liquid crystal panel 42 are in synchronization with each other in order to prevent the output data from the area image sensor 15 and the displaying on the liquid crystal panel 42 from not matching as frame units. Specifically, the timing generator 30 outputs the vertical synchronizing signal DVsync of the display section 40 after a predetermined time after the timing at which the vertical synchronizing signal SVsync of the area image sensor 15 has been outputted. As a result, in the present embodiment, the cycle of the vertical synchronizing signal SVsync and the cycle of the vertical synchronizing signal DVsync are identical and constant. Therefore, display of the subject captured by the area image sensor 15 on the liquid crystal panel 42 is not delayed by the time corresponding to a single frame or longer, and display of an image of the subject captured at the same timing does not remain on the liquid crystal panel 42 for a time corresponding to a plurality of frames.

Since the horizontal synchronization time prescribed by the horizontal synchronization signal DHsync of the liquid crystal panel 42 is of variable length in the present embodiment, the cycles of the vertical synchronization signals SVsync, DVsync are identical and constant even when the horizontal synchronization time varies. Specifically, by lengthening or shortening the horizontal synchronization time with respect to a reference time TH determined in advance, the timing generator 30 cancels out the time fluctuation from a reference time TH, and thereby controls the output signal so that the vertical synchronization time for displaying a single frame is constant. The reference time TH is configured as, e.g., the horizontal synchronization time in an instance in which each of the total number of lines of the liquid crystal panel 42 is displayed for an equal time within the vertical synchronization time.

In the subject image display region R1, a state is attained in which the horizontal synchronization time can be lengthened by waiting to output the horizontal synchronization signal DHsync until the process for generating the image data for each line has ended. In the information display region R2 of the liquid crystal panel 42 for displaying characters representing image-capturing conditions or other information, the horizontal synchronization time is made shorter than the reference time TH so as to cancel out the cumulative total of the difference between the horizontal synchronization time lengthened in the subject image display region R1 and the reference time TH.

Figure 4:
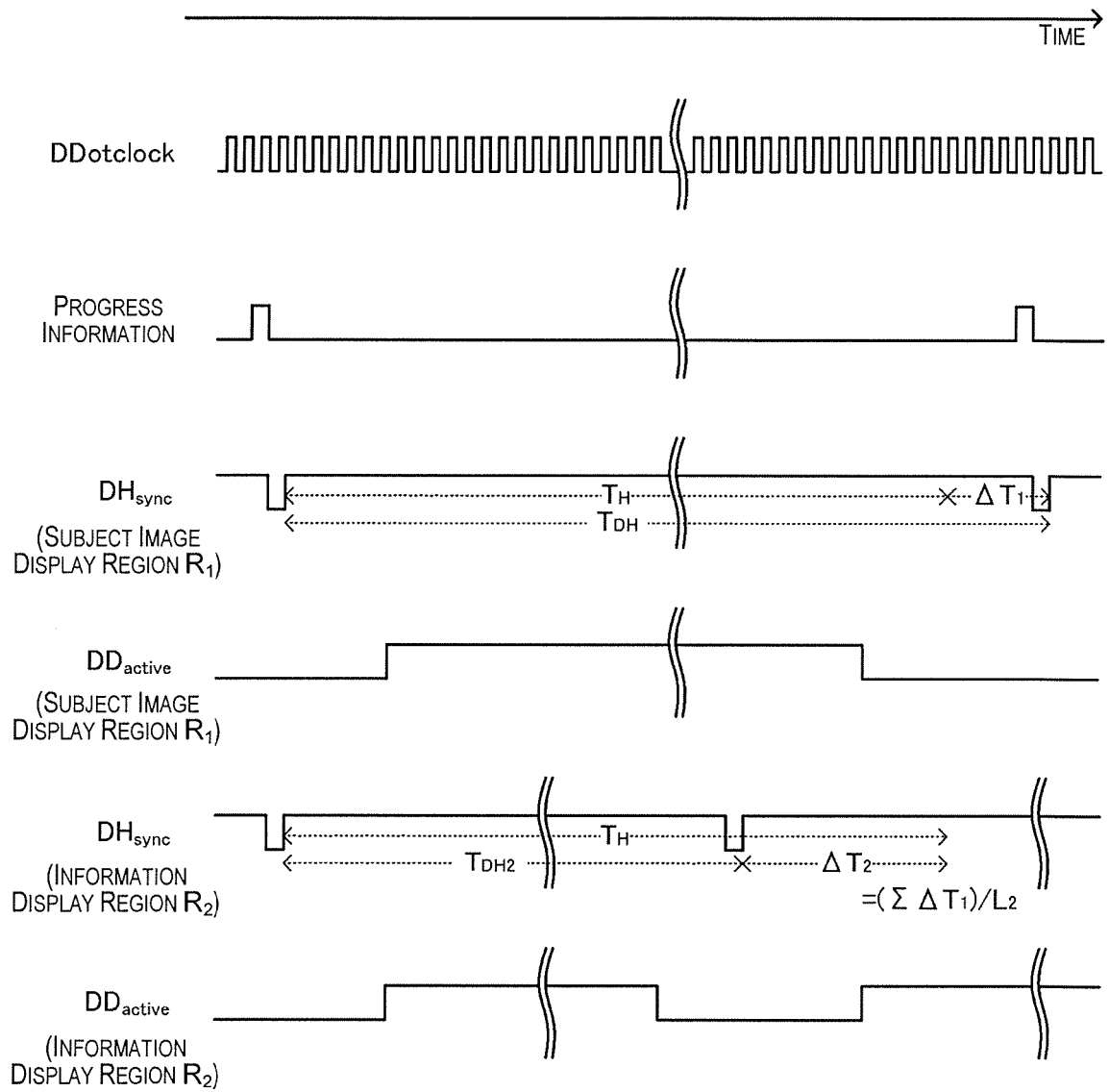
FIG. 4 is a timing chart showing a signal applied to the display section according to the present embodiment.

FIG. 4 shows the horizontal synchronization signal DHsync outputted from the timing generator 30 configured as described above, and also shows the data active signal DDactive, the data clock signal DDotclock, and progress information. In the present embodiment, the progress information outputted from the resizing processing section 20e is configured so as to maintain a low level output in the course of performing the processing for generating image data for a single line, and to form one pulse, during which the output is at a high level for a predetermined time, at the time when the processing for generating the image data for a single line has ended.

When the timing generator 30 obtains the progress information using the progress information acquisition section 30a, the display control section 30b performs a process to output the horizontal synchronizing signal DHsync in synchronization with the pulse of the progress information. In an instance in which the processing for generating image data for a particular line is not complete within the reference time TH, the horizontal synchronizing signal DHsync is not outputted until the generating process has ended, and the horizontal synchronizing time TDH becomes longer than the reference time TH. Therefore, in an instance in which the processing for generating image data for a particular line has not ended within the reference time TH, displaying of the corresponding line does not commence in the liquid crystal panel 42 until the generating process is complete. Also, no displaying is performed before preparation of image data for each of the lines has ended. Additionally, since the horizontal synchronizing signal DHsync is outputted when the processing for generating image data for a particular line has ended, displaying is performed without delay when preparation of image data for each of the lines has ended. As described above, in the present embodiment, the liquid crystal panel 42 is driven in a state in which the horizontal synchronizing time TDH may be longer than the reference time TH. Therefore, the present embodiment is suitable for application in a situation in which the time for generating image data for a single line to be displayed in a liquid crystal panel 42 may fluctuate between each of the lines. A possible example of such a situation is one in which the speed of the data output process by the area image sensor 15 or the speed of the processing for generating image data performed by the image data generation section 20 may be different for each of the lines. It shall be apparent that the present invention may be applied in a situation in which the processing speed is different for each of the lines depending on image-capturing conditions or the hardware used for image-capturing. For example, the present invention can be applied to a configuration in which the vertical synchronization time or the horizontal synchronization time of the area image sensor 15 fluctuates, or the time needed for processing for generating image data fluctuates, due to an operation of the operating section 55 by the user. The present invention can also be applied to a configuration in which the vertical synchronization time or the horizontal synchronization time of the area image sensor 15 fluctuates, or the time needed for processing for generating image data fluctuates, due to an interchangeable EVF or an interchangeable lens being changed.

As described above, in the subject image display region R1 in the present embodiment, the timing generator 30 adjusts the horizontal synchronization time TDH in accordance with the progress information outputted from the resizing processing section 20e. The horizontal synchronization signal DHsync may therefore be lengthened according to the progress of the processing for generating the image data to be displayed in the subject image display region R1, and the horizontal synchronization time TDH prescribed by the horizontal synchronization signal DHsync of the liquid crystal panel 42 is not necessarily constant. On the other hand, since the vertical synchronization time prescribed by the vertical synchronization signal DVsync is constant in the present embodiment as described above, the timing generator 30 sets the output timing of the horizontal synchronization signal DHsync so that a horizontal synchronization time TDH2 is shorter than the abovementioned reference time TH in the information display region R2, so that displaying of all the lines of the liquid crystal panel 42 has ended within the vertical synchronization time even in a case in which the horizontal synchronization time TDH in the subject image display region R1 is lengthened.

In other words, since the data (referred to as OSD data) representing the characters indicating the image-capturing conditions or other information can be created in advance and recorded in advance in the VRAM 51 irrespective of operation of the area image sensor 15, an appropriate display can be performed without overtaking the reading of data even when a display based on the OSD data is performed according to a short horizontal synchronization time. Therefore, in the present embodiment, the horizontal synchronization time in the information display region R2 for displaying characters indicating image-capturing conditions or other information is set so as to be shorter than that of the subject image display region R1 for performing displaying based on the output data of the area image sensor 15.

Specifically, the timing generator 30 adjusts the output timing of the horizontal synchronization signal DHsync, and thereby shortens the horizontal synchronization time TDH2 so that the sum of the differences between the lengthened horizontal synchronization time TDH and the reference time TH in the subject image display region R1, and the sum of the differences between the shortened horizontal synchronization time TDH2 and the reference time TH in the information display region R2 coincide. As a result, horizontal synchronization time TDH2<reference time≤horizontal synchronization time TDH. Various configurations can be adopted in the information display region R2 as configurations whereby the horizontal synchronization signal DHsync is outputted so that the horizontal synchronization time TDH2 is shorter than the reference time TH. For example, a configuration may be adopted in which, as shown in FIG. 4, the reduction in time in each line amounts to the value ΔT2 obtained by dividing the sum (ΣΔT1) of the delay ΔT1 with respect to the horizontal synchronization time TDH by the number of lines L2 of the information display region R2, the delay ΔT1 being generated in the subject image display region R1, as shown in FIG. 4. In other words, a configuration may be adopted in which the value of horizontal synchronization time TDH−ΔT2 is assumed to be the horizontal synchronization time TDH2 in the information display region R2.

As described above, in the present embodiment, in order to perform suitable displaying in each region according to the horizontal synchronization signal adjusted for each region of the liquid crystal panel 42, the line numbers of the portions of the liquid crystal panel 42 that correspond to the subject image display region R1 and the information display region R2 are determined in advance. For example, in the example shown in FIG. 2, lines 1 through 682 are the subject image display region R1, and lines 683 through 768 are the information display region R2. Therefore, the timing generator 30 outputs the horizontal synchronization signal DHsync so that the horizontal synchronization time TDH2 is shorter than the above-mentioned reference time TH during displaying in the information display region R2 that corresponds to lines 683 through 768, while the timing generator 30 outputs the horizontal synchronization signal DHsync, at a timing in accordance with the progress information, during displaying in the subject image display region R1 that corresponds to lines 1 through 682.

Also, the ASIC 200 comprises an image data output unit 201. When performing displaying for lines 1 through 682 of the liquid crystal panel 42, the image data output unit 201 outputs, line by line with respect to the display section 40, the image data (Data) recorded in the line buffer 52*d*. As a result, the image of the subject captured by the area image sensor 15 is displayed on the subject image display region R1. Also, the CPU 50 records the OSD data on the VRAM 51 at least before displaying is performed on the information display region R2. Then, when performing displaying for lines 683 through 768 of the liquid crystal panel 42, the image data output unit 201 obtains the OSD data recorded on the VRAM 51 and outputs, line by line with respect to the display section 40, the data as the image data (Data). As a result, characters indicating image-capturing conditions or other information are displayed on the information display region R2.

Through this configuration, display of image-capturing conditions or other information by the OSD data is performed within a short horizontal synchronization time in the information display region R2, while the subject photographed by the area image sensor 15 is displayed in the subject image display region R1 in a state of minimal delay. Since the horizontal synchronization time is also controlled as described above so that the sum of the differences between the lengthened horizontal synchronization time TDH and the reference time TH in the subject image display region R1, and the sum of the differences between the shortened horizontal synchronization time TDH2 and the reference time TH in the information display region R2 coincide, displaying by the display section 40 can be performed in a state in which the cycles of the vertical synchronization signals SVsync, DVsync are identical and constant. Therefore, display of the subject captured by the area image sensor 15 on the liquid crystal panel 42 is not delayed by the time corresponding to a single frame or longer, and display of an image of the subject captured at the same timing does not remain on the liquid crystal panel 42 for a time corresponding to a plurality of frames.

(3) Other Embodiments

The embodiment described above is an example of an implementation of the present invention, and is not limited to one in which whether or not the processing for generating image data has ended is determined for each of the lines according to progress information, and lines for which the generating process has ended are displayed. Whether or not the processing for generating image data has ended may also be determined for each predetermined unit according to progress information, where predetermined units for which the generating process has ended are displayed, using i lines, j pixels (where i and j are natural numbers), or another unit as the predetermined unit. The embodiments described hereinafter may also be combined with the embodiment described above, and various other embodiments are also possible.

For example, when lengthening the horizontal synchronizing time TDH so as to be longer than the reference time TH, the back porch of the horizontal synchronizing signal DHsync may be lengthened. This configuration is, for example, the configuration shown in FIG. 1, wherein the progress information acquisition section 30*a* detects the time over which the progress information is outputted from the resizing processing section 20*e*. Specifically, the progress information acquisition section 30*a* detects the time TS(N−1) between the progress information outputted at the time when the processing for generating the image data for the (N−1)$^{th}$ line has ended and the process information outputted at the time when the processing for generating the image data for the N$^{th}$ line has ended. Then, the timing generator 30 determines the length of the back porch of the horizontal synchronizing signal DHsync according to this time TS(N−1), and outputs the various types of signals.

Figure 5:
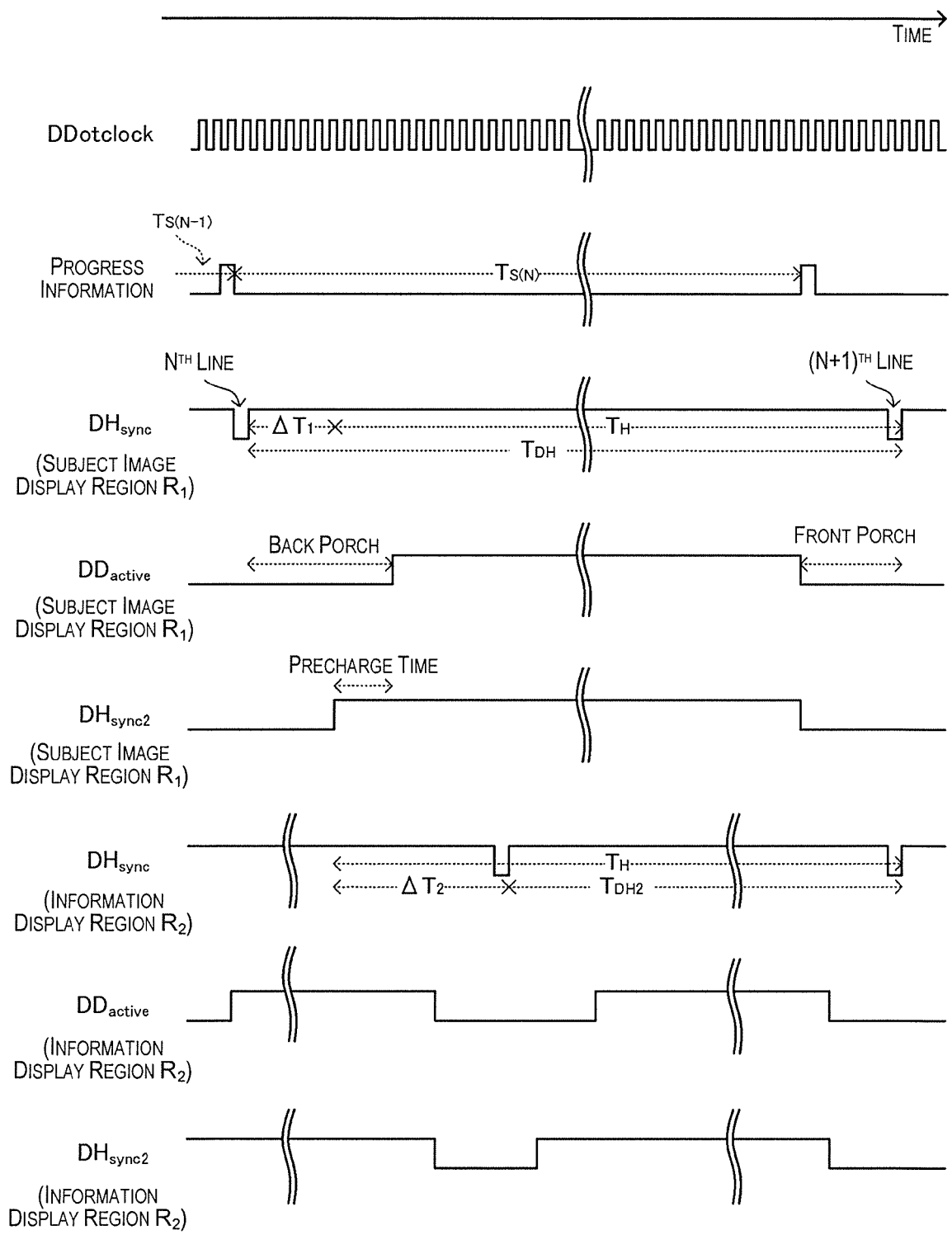
FIG. 5 is a timing chart showing another embodiment of the present invention.

Specifically, through processing performed by the display control section 30*b*, the timing generator 30 outputs a signal horizontal synchronizing signal DHsync2, indicating a precharge time, at the time when time ΔT1 has elapsed after outputting the horizontal synchronizing signal DHsync for the N$^{th}$ line, the time ΔT1 being obtained by subtracting the length of the reference time TH from the length of the time TS(N−1), as shown in FIG. 5. Then, through processing performed by the display control section 30b, the timing generator 30 outputs DDactive at the time when a predetermined precharge time has elapsed after outputting this signal DHsync2, maintains the level of the DDactive until the data clock signal DDotclock for the number of pixels for a single line is outputted, then provides a front porch of a predetermined time, and then outputs the horizontal synchronizing signal DHsync for the $(N+1)^{th}$ line. The time between the start of the precharge time and the time at which the front porch ends coincides with the reference time TH. Therefore, the horizontal synchronizing time TDH, which is the time between the horizontal synchronizing signal DHsync for the $N^{th}$ line and the horizontal synchronizing signal DHsync for the $(N+1)^{th}$ line, is the sum of the reference time TH and ΔT1. As a result, it becomes possible to perform precharging, polarity reversal, or a similar process in synchronization with the signal DHsyncs and perform displaying for the $N^{th}$ line on the liquid crystal panel 42, and to lengthen the horizontal synchronizing time TDH so as to be longer than the reference time TH.

In the first embodiment described above, the front porch of the horizontal synchronizing signal DHsync is lengthened. Therefore, it is possible to set the back porch time to a constant time, and it is possible to provide a time for performing the precharging, polarity reversal, or a similar process as normally prescribed.

Also, in the embodiment described above, the horizontal synchronizing signal SHsync is outputted so that the horizontal synchronization time is shorter in the information display region R2 of the liquid crystal panel 42 than in the subject image display region R1, in order to cause the cycle of the vertical synchronization signal SVsync of the area image sensor 15 and the cycle of the vertical synchronization signal DVsync of the liquid crystal panel 42 to coincide, but the cycle of the vertical synchronization signal SVsync and the cycle of the vertical synchronization signal DVsync of the liquid crystal panel 42 can be made to coincide by another method. For example, in a normal image-capturing device, since the area image sensor 15 has a larger number of lines than the liquid crystal panel 42, in an instance in which the horizontal synchronization time that should be maintained within a specific vertical synchronization time is assumed to be equal, the horizontal synchronization signal DHsync of the liquid crystal panel 42 is shorter than the horizontal synchronization signal SHsync of the area image sensor 15. Consequently, even in a case in which the horizontal synchronization signal DHsync of the liquid crystal panel 42 is lengthened, this lengthening does not often make it necessary to lengthen the vertical synchronization time of the liquid crystal panel 42. In an instance in which lengthening the horizontal synchronization signal DHsync causes the vertical synchronization signal DVsync of the liquid crystal panel 42 to be longer than the vertical synchronization signal SVsync of the area image sensor 15, the vertical synchronization signal SVsync of the area image sensor 15 may be lengthened, and the vertical synchronization signal DVsync and the vertical synchronization signal SVsync may be synchronized.

Also, the embodiment described above was configured so as to obtain progress information that indicates, for each of the lines, whether or not the resizing process in the processing for generating the image data has ended. However, even in an instance in which the final step of the processing for generating the image data is not the resizing process, progress information may be obtained with regards to the process that represents the final step. Also, in an instance in which the final step of the processing for generating the image data can be processed at a high enough speed so that the processing time is negligible or processed so that the processing time is constant, or the end of the final step can otherwise be forecast, progress information may be obtained with regards to the process that represents the penultimate step (e.g., a step whose processing time may fluctuate). A configuration is also possible in which, in an instance in which the processing for generating the image data includes an image processing step in which data for a plurality of lines is referenced and data for a single line is generated, progress information is obtained with regards to this step.

Figure 6:
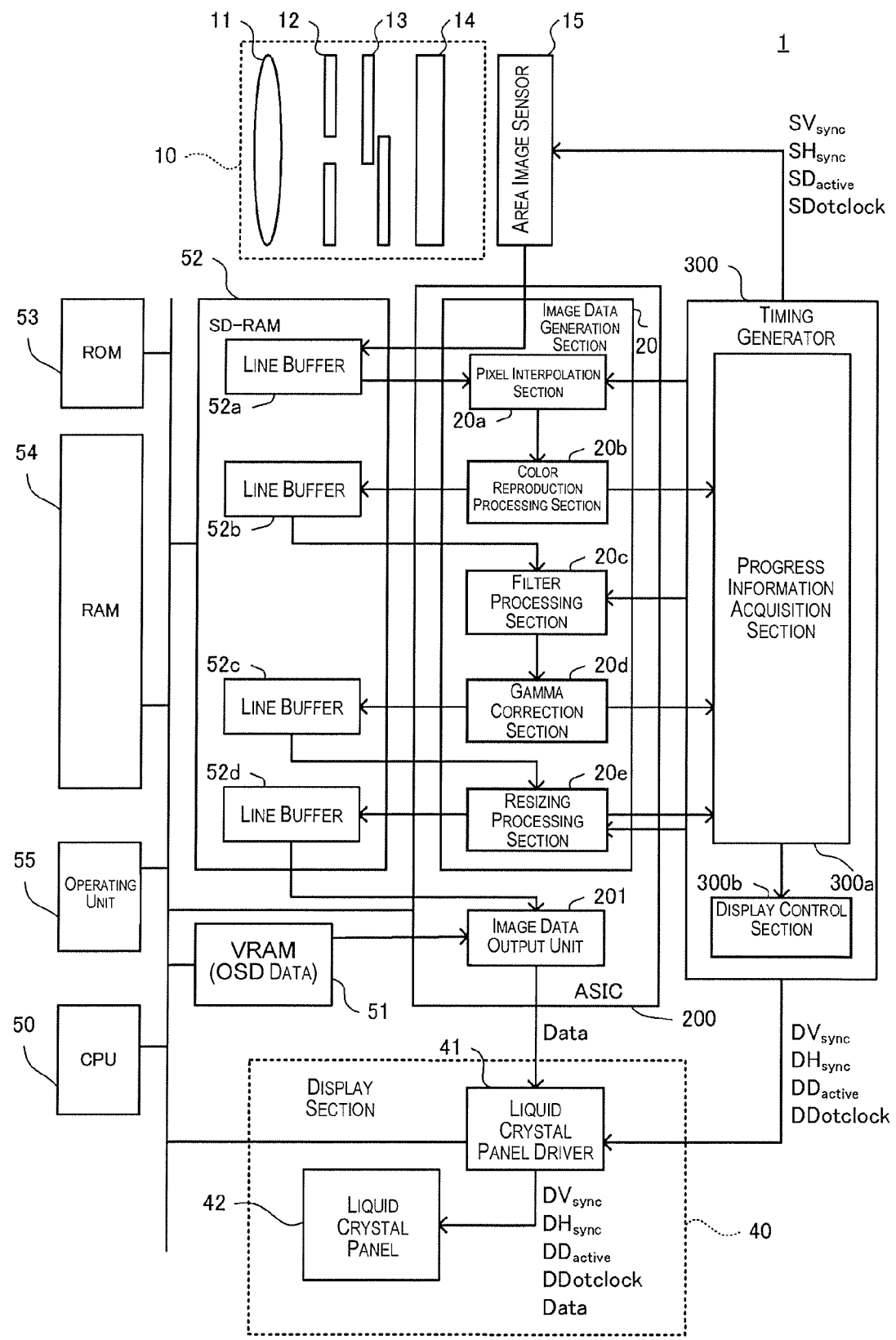
FIG. 6 is a block diagram showing another embodiment of the present invention.

FIG. 6 is a diagram showing the image-capturing device 1 comprising a configuration for obtaining progress information with regards to a plurality of image processing steps for referencing data for a plurality of lines and generating data for a single line. In FIG. 6, structures that are identical to those in FIG. 1 are indicated using the same numerals. A timing generator 300 of the image-capturing device 1 shown in FIG. 6 is capable of obtaining progress information indicating lines for which output of output data from the area image sensor 15 is complete, as well as lines for which the processing for generating data in each of the color reproduction processing section 20b, the gamma correction section 20d, and the resizing processing section 20e of the image data generation section 20 has ended. The timing generator 300 is also capable of outputting a trigger signal (e.g., a horizontal synchronizing signal), for causing the processing for generating data for a single line to commence, to the pixel interpolation section 20a, the filter processing section 20c, and the resizing processing section 20e, through processing performed by the display control section 300b.

Specifically, in the embodiment shown in FIG. 6, it is determined in advance that when output data for the $K^{th}$ line is outputted from the area image sensor 15, it becomes possible to perform processing of data for the $L^{th}$ line in the pixel interpolation section 20a, and when processing of data for the $L^{th}$ line has ended as a result of line-by-line processing performed by the pixel interpolation section 20a and the color reproduction processing section 20b, it becomes possible to perform processing of data for the $M^{th}$ line in the filter processing section 20c. Also, it is specified in advance that when processing of data for the $M^{th}$ line has ended as a result of line-by-line processing performed by the filter processing section 20c and the gamma correction section 20d, it becomes possible to commence the processing for generating image data for the $N^{th}$ line in the resizing processing section 20e.

The timing generator 300 determines that output data for the $K^{th}$ line has been outputted from the area image sensor 15 according to a horizontal synchronizing signal SHsync, having a prescribed cycle, outputted by the timing generator 300. In an instance in which it has been determined that output data for the $K^{th}$ line has been outputted from the area image sensor 15, the timing generator 300 outputs a trigger signal to the pixel interpolation section 20a and causes the pixel interpolation section 20a to commence processing of data for the $L^{th}$ line. In an instance in which it has been determined by the progress information acquisition section 300a that processing of data for the $L^{th}$ line in the color reproduction processing section 20b has ended, the timing generator 300 outputs a trigger signal to the filter processing section 20c and causes the filter processing section 20c to commence processing of data for the $M^{th}$ line. Also, in an instance in which it has been determined by the progress information acquisition section 300a that processing of data for the $M^{th}$ line in the gamma correction section 20d has ended, the timing generator 300 outputs a trigger signal to the resizing processing section 20e and causes the resizing processing section 20e to commence the processing for generating image data for the $N^{th}$ line.

When it has been determined that the processing for generating the image data for the $N^{th}$ line by the resizing processing section 20e has ended, the timing generator 300 outputs a horizontal synchronizing signal DHsync for performing displaying for the $N^{th}$ line, as with the embodiment described above. Specifically, in the image data generation section 20, in an image processing step in which it is possible to commence generation of data for a line after data for two or more lines is recorded in a line buffer, a judgement is made as to whether or not the processing for generating data for the minimum number of lines necessary has ended, and the next image processing step is commenced at the time when the generating process has ended. This configuration makes it possible to immediately commence processing of data for each of the lines when preparation of data necessary for performing each of the steps is complete, without commencing processing for each of the lines before the data for each of the lines is prepared. As a result, the waiting time for performing each of the image processing steps is minimized. In the present embodiment, it is only necessary to temporarily record data for the minimum number of lines necessary into the line buffers 52a through 52d, and the capacity of the line buffers 52a through 52d can be minimized.

Furthermore, the display section 40 is an EVF which uses a liquid crystal panel in the embodiment described above, but the display section 40 may be a display section other than an EVF. For example, the display section 40 may be a display section which uses a liquid crystal panel attached to a back surface of the image-capturing device 1, or the display section 40 may be configured to use a display section other than a liquid crystal panel. The image-capturing device 1 may also be a single-lens reflex camera provided with a mirror, the image-capturing device 1 may be a movie camera, or the image-capturing device 1 may be a mobile telephone or other device provided with image-capturing functionality. The color filters are also in a Bayer pattern in the area image sensor 15 described above, but the present invention may also be applied in an image-capturing device which utilizes a sensor configured in an arrangement other than a Bayer pattern. The line buffer 52d may be a line buffer, but may also be a VRAM provided with a recording capacity for recording the image data corresponding to a single frame. Through this configuration, various types of processing can be performed according to the image data to be displayed. The horizontal synchronization time is also preferably lengthened with respect to a reference time, and various types of time periods can be assumed as the reference time. For example, the cycle of the horizontal synchronization signal SHsync of the area image sensor 15, the cycle for generating the image data, and other cycles may be used as the reference time. Furthermore, various forms may be adopted as the form in which various types of signals are transmitted from the timing generator 30 to the display section 40, and signals may be transmitted by HDMI (High-Definition Multimedia Interface) and other methods. The directions in the embodiment described above may also be reversed. In the horizontal direction, for example, display may be performed from left to right or from right to left.

Furthermore, the OSD data is preferably image data indicating predetermined information to be displayed in the information display region of the display section, and a configuration may be adopted in which the predetermined information to be displayed includes various types of information other than image-capturing conditions, e.g., information indicating the remaining amount of power in a battery mounted in the image-capturing device 1, or other information. Various configurations other than the configuration described above may also be employed as the configuration for making the cycles of the vertical synchronization signals SVsync, DVsync identical and constant. For example, a configuration may be adopted in which, after display in the subject image display region R1 is performed, the shortest time that can be set for displaying the OSD data in the information display region R2 is used as the horizontal synchronization time in the information display region R2, whereby display of all the lines of the liquid crystal panel 42 is completed before the output timing of the vertical synchronization signal DVsync, and the vertical synchronization signal DVsync is outputted at a prescribed output timing after waiting for the remainder of the time.

Also, in the embodiment described above, each of the subject image display region and the information display region is provided as a single region, with the subject image display region being arranged on an upper part of the liquid crystal panel 42 and the information display region being provided on a lower part of the liquid crystal panel 42. Therefore, in the embodiment described above, after displaying is performed line by line from the line at the upper end of the subject image display region to the line at the lower end of the subject image display region, it is possible to then perform displaying, in continuation, line by line from the line at the upper end of the information display region to the line at the lower end of the information display region. In the embodiment described above, this configuration is used to determine the line display time in the information display region in which displaying is performed later.

A configuration of such description in which displaying in the information display region is performed after displaying is performed in the subject image display region, whereby the line display time in the information display region can be determined, can be obtained whether or not the subject image display region is a single region that is continuous in the vertical direction. Specifically, it is possible to obtain a configuration in which, when performing displaying corresponding to a single frame, displaying is performed line by line from the line positioned at one end of the subject image display region, and after displaying is performed for the line positioned at another end of the subject image display region, displaying is performed line by line for each of the lines in the information display region starting from the line adjacent to the another end of the subject image display region.

Information display can also be performed so as to surround the periphery of the subject image. In this instance, a configuration is possible in which the subject image and some of the information is to be displayed on the subject image display region as a region formed from lines including the subject image; and information only is displayed, and the subject image is not displayed, on the information display region as a region formed from lines that do not include the subject image.

For example, a configuration is assumed in which an information display region is provided at each of an upper end and a lower end of the liquid crystal panel 42, and a subject image display region is provided between the upper and lower information display regions. Even in this configuration, it is possible to readily determine the line display time in the information display region if displaying is performed in the following sequence. Specifically, displaying is commenced from the upper end of the subject image display region rather than the upper end of the liquid crystal panel 42, and displaying is performed down to the lower end of the subject image display region. Then, displaying is performed with regards to the line of the information display region that is adjacent to the lower end of the subject image display region, and displaying is then performed downwards, line by line. When displaying has been performed down to the lower end of the liquid crystal panel 42, displaying is further performed line by line from an upper end of the liquid crystal panel 42 to the lower end of the remaining information display region.

However, the sequence of displaying or the line display time in the information display region is not necessarily determined as described above. For example, in a configuration in which an information display region is provided at each of an upper end and a lower end of the liquid crystal panel 42, and the subject image display region is provided between the upper and lower information display regions, displaying may be commenced from the upper end of the liquid crystal panel 42, and the line display time of the information display region on the lower end-side of the liquid crystal panel 42 may be determined according to the line display time of the information display region on the upper end-side and the line display time of the subject image display region.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An image-displaying device comprising:
    an image data generation section configured to perform processing for generating image data indicative of an image of a subject based on output data from an image-capturing section that captures the image of the subject;
    an information data acquisition section configured to acquire information data for causing predetermined information to be displayed as texts in an information display region of a display section, the predetermined information being conditions in capturing the image of the subject; and
    a display control section configured to control the display section to display the image of the subject in a subject image display region of the display section according to the image data generated by the processing for generating the image data, and to display the predetermined information in the information display region of the display section according to the information data,
    the display control section being configured to control the display section so that a horizontal synchronization period of a predetermined unit in the information display region is shorter than a horizontal synchronization period of the predetermined unit in the subject image display region.

2. The image-displaying device according to claim 1, wherein
    the display control section is configured to acquire progress information indicative of a status of progress of the processing for generating the image data for each of the predetermined unit, and to control the display section to display the predetermined unit, for which it has been determined by the progress information that the processing for generating the image data has ended, in the subject image display region.

3. The image-displaying device according to claim 1, wherein
    the display control section is configured to shorten the predetermined unit display period so that a value obtained by subtracting, from a reference period for the predetermined unit display period in the subject image display region, a value obtained by dividing a total sum of a delay in relation to the reference period by a number of the predetermined unit in the information display region represents an upper limit value of the predetermined unit display period in the information display region.

4. The image-displaying device according to claim 3, wherein
    the subject image display region is a single region that is continuous in a direction in which the predetermined unit are arranged, and when displaying corresponding to a single frame is performed, the display control section is configured to perform displaying starting from the predetermined unit that is positioned at one end of the subject image display region, and after performing displaying in the predetermined unit that is positioned at another end of the subject image display region, performs displaying in each of the number of the predetermined unit in the information display region, starting from the predetermined unit that is adjacent to the another end of the subject image display region.

5. The image-displaying device according to claim 1, wherein
    the predetermined unit display period is variable, and
    the display control section is configured to maintain a total of a sum of the predetermined unit display period in the subject image display region and a sum of the predetermined unit display period in the information display region to a predetermined length of period.

6. The image-displaying device according to claim 1, wherein
    the predetermined unit corresponds to a single line in a horizontal direction.

7. An image-displaying device comprising:
    an image data generation section programmed to perform processing for generating image data indicative of an image of a subject based on output data from an image-capturing section that captures the image of the subject;
    an information data acquisition section programmed to acquire information data for causing predetermined information to be displayed as texts in an information display region of a display section, the predetermined information being conditions in capturing the image of the subject; and a display control section programmed to control the display section to display the image of the subject in a subject image display region of the display section according to the image data generated by the processing for generating the image data, and to display the predetermined information in the information display region of the display section according to the information data, the display control section being programmed to control the display section so that a horizontal synchronization period of a predetermined unit in the information display region is shorter than a horizontal synchronization period of the predetermined unit in the subject image display region.

* * * * *